US012234852B2

(12) United States Patent
De Frene et al.

(10) Patent No.: US 12,234,852 B2
(45) Date of Patent: Feb. 25, 2025

(54) FASTENING ELEMENT

(71) Applicant: RENSON NV, Waregem (BE)

(72) Inventors: Joost De Frene, Waregem (BE); Elien Henriette Roger Delmotte, Kortrijk (BE); John Urbain Houfflyn, Waregem (BE); Kristof Gustaaf Vanluchene, Machelen (BE)

(73) Assignee: RENSON NV, Waregem (BE)

( * ) Notice: Subject to any disclaimer, the term of this patent is extended or adjusted under 35 U.S.C. 154(b) by 206 days.

(21) Appl. No.: 17/792,345

(22) PCT Filed: Jan. 12, 2021

(86) PCT No.: PCT/EP2021/050444
§ 371 (c)(1),
(2) Date: Jul. 12, 2022

(87) PCT Pub. No.: WO2021/144243
PCT Pub. Date: Jul. 22, 2021

(65) Prior Publication Data
US 2023/0030771 A1 Feb. 2, 2023

(30) Foreign Application Priority Data

Jan. 14, 2020 (BE) .................................. 2020/0007

(51) Int. Cl.
*F16B 37/04* (2006.01)
*E04F 13/08* (2006.01)
*F16B 25/00* (2006.01)

(52) U.S. Cl.
CPC ........ *F16B 37/045* (2013.01); *E04F 13/0805* (2013.01); *F16B 25/0063* (2013.01)

(58) Field of Classification Search
CPC .. F16B 25/0063; F16B 37/045; E04F 13/0805
(Continued)

(56) References Cited

U.S. PATENT DOCUMENTS 890,285 A * 6/1908 Krantz ................. H02G 3/0418
411/401
1,528,777 A * 3/1925 Marting ................ E04B 1/4107
52/351
(Continued)

FOREIGN PATENT DOCUMENTS

BE 1025260 A1 1/2019
DE 2440454 B1 10/1975
(Continued)

OTHER PUBLICATIONS

International Search Report from PCT Application No. PCT/EP2021/050444, Apr. 29, 2021.
(Continued)

*Primary Examiner* — James M Ference
(74) *Attorney, Agent, or Firm* — Workman Nydegger

(57) ABSTRACT

A fastening element, a fastening assembly and a method for fastening are described, such that the fastening element is configured so that it cooperates in such a way with an elongated element that it allows for a rotation of the fastening element about the central axis of the opening between a fastened state, in which a first angular position of the fastening element is transverse to the longitudinal axis of the elongated element and a removable state in which the second angular position is transverse to the longitudinal axis of the elongated element.

13 Claims, 8 Drawing Sheets

(58) Field of Classification Search
USPC .................... 52/710; 411/84, 85, 966
See application file for complete search history.

(56) References Cited

U.S. PATENT DOCUMENTS

| | | | | | |
|---|---|---|---|---|---|
| 1,769,498 | A | * | 7/1930 | Downing | F16B 5/0225 52/367 |
| 2,144,350 | A | * | 1/1939 | Swanstrom | F16B 37/045 411/84 |
| 2,237,595 | A | * | 4/1941 | Dyer | F16B 37/044 411/84 |
| 2,249,923 | A | * | 7/1941 | Whitcombe | F16B 37/045 411/85 |
| 2,314,509 | A | * | 3/1943 | Olson | F16B 37/045 411/85 |
| 2,345,650 | A | * | 4/1944 | Attwood | E06B 3/9687 411/105 |
| 2,381,233 | A | * | 8/1945 | Mills | F16B 37/044 411/176 |
| 2,413,669 | A | * | 12/1946 | Whitcombe | F16B 37/045 411/85 |
| 2,421,278 | A | * | 5/1947 | Luce | F16B 37/045 411/84 |
| 2,429,833 | A | * | 10/1947 | Luce | F16B 5/025 411/84 |
| 2,575,594 | A | * | 11/1951 | Reiner | F16B 37/046 411/85 |
| 2,676,680 | A | * | 4/1954 | Kindorf | E04B 9/183 248/228.2 |
| 2,681,679 | A | * | 6/1954 | Ougljesa | F16B 37/042 411/113 |
| 2,682,906 | A | * | 7/1954 | Ougljesa | F16B 37/044 411/971 |
| 2,705,991 | A | * | 4/1955 | Reiner | F16B 37/044 411/84 |
| 2,809,726 | A | * | 10/1957 | Farquhar | F16B 5/0072 52/464 |
| 2,879,820 | A | * | 3/1959 | Trzcinski | F16B 37/045 411/84 |
| 2,928,512 | A | * | 3/1960 | Slater | F16B 37/045 403/22 |
| 2,944,642 | A | * | 7/1960 | Evans | E04G 7/26 411/959 |
| 3,031,217 | A | * | 4/1962 | Tinnerman | F16B 7/0486 403/187 |
| 3,053,355 | A | * | 9/1962 | Attwood | F16B 37/045 411/959 |
| 3,456,706 | A | * | 7/1969 | Ollis, Jr. | F16B 37/04 411/84 |
| 3,670,796 | A | * | 6/1972 | Grimm | F16B 37/044 411/970 |
| 3,903,671 | A | * | 9/1975 | Cuin | E04F 13/0825 52/480 |
| 4,040,228 | A | * | 8/1977 | Skubic | E04B 1/4107 411/302 |
| 4,073,113 | A | * | 2/1978 | Oudot | F16B 7/0486 403/189 |
| 4,161,303 | A | * | 7/1979 | Bachand | F16B 37/045 248/246 |
| 4,488,844 | A | * | 12/1984 | Baubles | F16B 37/045 411/177 |
| 4,545,697 | A | * | 10/1985 | Verdenne | F16B 37/046 403/252 |
| 4,662,590 | A | * | 5/1987 | Hungerford, Jr. | F16B 37/045 403/353 |
| 4,768,907 | A | * | 9/1988 | Gauron | F16B 37/044 411/85 |
| 4,895,484 | A | * | 1/1990 | Wilcox | F16B 37/044 411/85 |
| 4,948,313 | A | * | 8/1990 | Zankovich | F16B 37/045 411/85 |
| 5,199,836 | A | * | 4/1993 | Gogarty | F16B 37/045 411/84 |
| 5,489,173 | A | * | 2/1996 | Hofle | F16B 37/046 411/85 |
| 5,779,412 | A | * | 7/1998 | Nagai | F16B 37/046 411/432 |
| 5,820,322 | A | * | 10/1998 | Hermann | F16B 37/045 411/84 |
| 6,086,300 | A | * | 7/2000 | Frohlich | F16B 37/045 411/84 |
| 6,726,117 | B2 | * | 4/2004 | Herb | F16B 37/046 238/315 |
| 7,044,701 | B2 | * | 5/2006 | Herb | F16B 37/046 411/84 |
| 8,277,158 | B2 | * | 10/2012 | Csik | F16B 37/046 411/111 |
| 2002/0098035 | A1 | * | 7/2002 | Karlinger | F16B 37/045 403/187 |
| 2013/0177366 | A1 | * | 7/2013 | Whipple | F16B 37/045 411/172 |
| 2014/0250825 | A1 | * | 9/2014 | Richardson | F16B 7/187 411/81 |
| 2023/0030771 | A1 | * | 2/2023 | De Frene | F16B 37/045 |

FOREIGN PATENT DOCUMENTS

| | | |
|---|---|---|
| DE | 2939117 A1 | 4/1981 |
| DE | 29619956 U1 | 12/1997 |
| EP | 1203853 A2 | 5/2002 |
| EP | 1203853 A3 | 10/2003 |
| GB | 2191840 A | 12/1987 |

OTHER PUBLICATIONS

Search Report from corresponding Belgian Application No. BE202000007, Sep. 30, 2020.
"Shim Screws", Conservation Technology, as early as Dec. 31, 2008, retrieved from the Internet on Jul. 11, 2022 from http://www.conservationtechnology.com/building_shimscrews.html.

* cited by examiner

FASTENING ELEMENT

FIELD OF THE INVENTION

The invention relates to a fastening element, a fastening assembly including such a fastening element and related methods for fastening using such a fastening element. More particularly, the invention relates to the technical field of fastening elements for use in fastening elongated profiles or other elongated elements to a wall, by means of a helical alignment element or an element containing such a helical alignment element such as, for example, a screw containing such helical alignment element, for adjusting the distance of such profiles to the wall.

BACKGROUND OF THE INVENTION

Such screws containing an alignment element at their end, also referred to as shim screw in English, and their general function for aligning an element to a wall is known, for example, from http://www.conservationtechnology.com/building_shimscrews.html. Such an embodiment is schematically shown in FIG. 1, where it is clear that the elongated screw 10 contains at its insertion side 12, also the front end 12, a screw element for screwing into a wall and contains at its opposite end 14, also back end 14, a helical alignment element 20 for aligning an element to be fastened, such as, for example, an elongated profile, after screwing the front end 12 of the elongated screw 10 into the wall.

A known method for fastening elongated profiles is shown in FIGS. 2 to 4 and relates, for example, to a support structure for wall covering elements similar to that described in BE1025260A1. Elongated profiles 2 form there a structure fastening 2 for fastening a wall covering element 3 which may be fastened by means of a structure fastening element 4 to the elongated profiles 2. These elongated profiles have a substantially C-shaped cross-section, of which the elongated opening is facing away from the wall 30 to which the elongated profiles 2 are being fastened. As may be seen, for example, in FIGS. 2 to 4, according to such an embodiment, the wall 30 at the side of the profiles 2 to be fastened typically also contains a later of insulating material 32. It is clear that the fastening assembly requires screws 10 long enough to be able to be partially screwed at their front end 12 through the insulating material 32 in a sufficiently strong part of the wall 30. As may be seen, according to such an embodiment, the profiles 2, typically metal profiles, for example aluminium profiles, through which other transverse elongated elements 6, such as, for example, wooden laths or twill, which then extend along their longitudinal direction transversally to the longitudinal direction of the profiles 2 in the fastened state. Subsequently, a screw 10, similar to that shown in FIG. 1, is applied at the open front side of the profile 2 through an opening in the back wall of the profile 2, through the transverse elongated elements 6 into the wall 30 until the helical alignment element 20 of the screw 10 engages in the opening of the profile 2, so that the distance of the profile 2 to the wall 30 may then be controlled in a way that the profiles 2 are mutually aligned for fastening of the wall covering elements 3. The need for applying the transverse elongated elements 6 is therein a disadvantage, since the width of the assembly between the wall 30 and the profile 2 increases, thereby, for example, reducing the usable surface at a certain available buildable surface, and/or causing problems in afterwards applying such profiles to a wall wherein only limited space is available. Furthermore, as already mentioned above, the transverse elongated elements 6 are typically wooden elements 6. Such wooden elements, in particular when used for building elements at the outside of a building or a structure located in the open air, are subject to the elements, in which in particular moisture may have an adverse effect on the lifespan of these wooden elements. In applications similar to those described above, such wooden elongated transverse elements are located at the back side of the wall covering elements, or in other words, these wooden elongated transverse elements are typically no longer visible after applying and covering the fastening assembly. Therefore, inspection of the state of the wooden elongated transverse elements is hindered, which hinders an estimation of their ageing and reduces reliability and robustness of the fastening assembly on the long term. Often the lifespan of the wall covering and the building or building structure exceeds the lifespan of such wooden elongated transverse elements, thereby urging replacement of these wooden elongated transverse elements in the course of time. However, replacement of the wooden elongated transverse elements requires a complete disassembly of the applied wall covering and the fastening assembly. Even in case of some local problems, for example as a result of storm damage or local water infiltration, the wall covering and the fastening assembly have to be disassembled over a significant area, since the elongated wooden transverse elements 6 extend transversally with respect to the elongated profiles 2. Furthermore, such profiles 2 are typically metal profiles, such as, for example, aluminium profiles, or any other suitable metal such as, for example, steel, etc. Since the helical alignment element 20 has to engage in the opening of the profile 2, the material of the helical alignment element 20 should be harder than the material of the profile 2, for example tempered steel, which limits the choice of the suitable helical alignment elements 20 and gives rise to screws 10 with such a helical alignment element 20 which are less easily produced. Furthermore, it is clear, for example from FIG. 3, that the openings in the profiles 2 for inserting the screws 10 should be disposed at the position of the transverse wooden laths. This reduces the flexibility for disposing the openings in the profiles or requires disposing the transvers laths at exactly the same position as pre-made holes in the profiles 2. Moreover, there is a need to reduce the use of material for fastening the profiles 2, in order to allow for a more environmentally friendly fastening, as well as, for example, to reduce the total weight of the assembly for fastening the profiles to a wall. Furthermore, there is also a need for an improved distribution of the load via the profiles 2 to the wall. The connection of the profiles 2 with the helical alignment element 20 now forms a very concentrated load for the profiles, which is typically exerted at the level of an opening in a relatively thin metal plate of a few mm, for example 5 mm or less, typically 2 mm or less. Therefore, with increasing load, for example in storm conditions or large wind load, there is a risk of deformation or damaging of the openings of the profiles 2, thereby jeopardising the reliability of the attachment assembly.

Finally, another known method is disclosed in DE 296 19 956 U1, presenting a solution for fastening cladding panels to an uneven masonry. A molded part is used, comprising a clamping element and a grip element. The molded part is designed to cooperate with a profile, in that the clamping element fits within the profile, while the grip element remains outside the profile and allows to rotate the clamping element from a loose to a fixed position. In the presented solution, the molded parts are first fastened to the wall by means of screws. Next, the profile is placed on the molded parts by positioning the profile over the clamping elements.

The clamping elements are now covered by the profile, but the grip elements—being positioned between the profile and the wall—are still accessible as they extend outside the profile. Therefore, the grip elements allow to rotate the clamping elements towards their fixed position. Finally, the cladding panels are attached to the closed side of the profile. The solution of D1 does not allow for a fast and simple mounting of the profile, as the profile needs to be accurately shifted over the molded parts, and the molded parts can hardly be reached when being covered by the profile. Furthermore, the protruding grip element, being positioned between the profile and the wall, prevents a close positioning of the profile to the wall.

SUMMARY OF THE INVENTION

A fastening element, a fastening assembly and a method for using a fastening element are provided, which overcome the foregoing problems and allow for a more efficient, more flexible, simpler, lighter, more reliable, more storm proof and more environmentally friendly fastening to a wall of elongated elements, such as for example elongated profiles, in particular elongated profiles with a C-shaped cross-section.

According to a first aspect of the invention, a fastening assembly is provided, comprising one or more fastening elements and one or more elongated elements, wherein a fastening element comprised in the one or more fastening elements is configured for fastening an elongated element, comprised in the one or more elongated elements, to a wall by means of a screw comprising a helical alignment element, wherein the screw is inserted in the wall through an opening in the elongated element, wherein:

the fastening element has an opening with a central axis, extending from the front side to the back side, the opening being configured so that after the screw has been inserted through it, the helical alignment element may engage therein; and the fastening element, viewed transversally to the central axis and viewed in the direction of a first angular position about the central axis, extends over a first distance, the fastening element, viewed transversally to the central axis and viewed in the direction of a second angular position about the central axis, extends over a second distance, wherein the second distance is smaller than the first distance and the difference between the first angular position and the second angular position is in the range of 30° to 150°, and wherein the fastening element is configured so that it cooperates with the elongated element in such a way to allow rotation of the fastening element about the central axis of the opening between a fastened state, in which the first angular position of the fastening element is transverse to the longitudinal axis of the elongated element, and a removable state, in which the second angular position is transverse to the longitudinal axis of the elongated element, characterized in that:

the elongated element comprises an elongated profile with a C-shaped cross-section having an open side and internal cavity;

the second distance is such that, in the removable state, the fastening element may be brought through the open side out of the internal cavity;

the first distance is such that, after inserting the fastening element in the internal cavity in the removable state, and rotating the fastening element from the removable state towards the fastened state, the fastening element runs against the elongated profile; and in the fastened state, the fastening element is positioned within the internal cavity of the elongated profile and may no longer be brought out of the elongated profile.

Such a fastening element allows for a more efficient fastening since transverse elongated elements no longer need to be provided between the wall and the elongated elements. The fastening element also provides more flexibility for the positioning of the openings in the elongated elements and the location of these openings do not have to be matched to the location of such transverse elongated elements and vice versa, allowing for a more flexible mounting. These fastening means are also lighter and simpler, and thus give rise to a lighter and simpler fastening assembly. Moreover, the fastening elements applied in the elongated elements ensure that the helical alignment element does no longer need to engage with the opening of the elongated element, but may also engage in the fastening element, which contains a larger contact surface for both the elongated element and the helical alignment element. Therefore, the risk of point load and deformation is smaller, even in case of larger loads, whereby a reliable and storm proof fastening assembly may be realised with such a fastening element. Such fastening elements are also more environmentally friendly, since less material is required for these fastening element than for the elongated transverse elements as in the known systems.

Such a fastening assembly is in particular advantageous in use with an elongated profile with a C-shaped cross-section, since the fastening element may be applied in a flexible manner at a suitable location along the profile and the profile may, for example, be provided already in advance with suitable openings at a regular distance, whereby elongated transverse elements no longer need to be taken into account. The C-shaped cross-section defines an internal cavity and has an open side allowing to insert the fastening element into the cavity while being in the removable state. Since the fastening elements are positioned within the internal cavity of such a C-profile, the total depth of such a fastening assembly decreases as well.

According to a further embodiment, a fastening assembly is provided, wherein the opening in the fastening element has a diameter smaller than the opening in the elongated element with which the central axis of the opening in the fastened state coincides.

In this way, the risk of an excessive mechanical load on the elongated profiles, for example an aluminium profile, by the helical alignment element, which contains, for example, a tempered steel helical alignment element having an external screw thread that turns into the wall of the profile, decreases, of is even completely prevented when the diameter of the opening in the elongated profiles is larger than the diameter of the helical alignment element.

According to a further embodiment, a fastening assembly is provided wherein the fastening element is made of a softer material than the material of the elongated element.

Preferably, the fastening element is made of a suitable plastic and the elongated element from a suitable metal. In this way, a relatively simple metal alignment bolt may be employed, which does not necessarily need to be harder than the material of the elongated element, and which may be applied with limited force in the fastening element without the risk of deformation of the material of the elongated element or the alignment bolt.

According to a further embodiment, a fastening assembly is provided, wherein the fastening element furthermore comprises a non-combustible part surrounding the opening.

Preferably the non-combustible part is a metal part, for example a metal plate which is disposed on or in the fastening element, which was for example for the remainder made of plastic. Preferably, this non-combustible element is configured to ensure, in case of fire and melting or burning of the plastic part of the fastening element, that a secure connection is maintained between the elongated element and the screw having the helical alignment element.

According to a further embodiment, a fastening assembly is provided, wherein the fastening element comprises one or more securing elements configured to cooperate in the fastened state with the elongated element to resist against rotation to the inserted state.

In this way, the alignment of the profile by means of the helical alignment element is facilitated since during aligning, the fastening element is held in the fastened position with greater certainty.

According to a further embodiment, a fastening assembly is provided, wherein one or more of the securing elements are configured to allow for deactivation, thereby allowing for a rotation back from the fastened state to the removable state after deactivation.

In this way, the fastening element may be held in the fastened state with a greater certainty and may be easily rotated back to the removable state after deactivation.

According to a further embodiment, a fastening assembly is provided, wherein the fastening assembly is configured to connect in the fastened state the elongated element via the respective fastening element to the corresponding helical alignment element of the corresponding screw.

In this way a reliable fastening is possible wherein a risk of overload and/or deformation of the opening of the elongated element is prevented.

According to an embodiment, a fastening assembly is provided, wherein the fastening assembly furthermore comprises the one or more corresponding screws, and wherein, in the fastened state, the elongated element is directly connected to the fastening elements and the respective helical alignment elements are directly connected to the corresponding opening of the fastening elements.

Preferably the elongated profile is no longer directly connected to the screw, but solely via the fastening elements. This is advantageous, in particular in case of metal screws and elongated profiles and plastic fastening elements, since in this way a thermal bridge is interrupted, and contact corrosion is prevented when different metals are used.

According to a further embodiment, a fastening assembly is provided, wherein, in the fastened state, the respective fastening element extends, along a depth direction corresponding to the central axis of the opening, over a depth greater than the wall thickness of the elongated element at the corresponding opening.

This ensures a larger support and interface between the fastening element and the elongated assembly than is available at the level of the opening of the elongated element, reducing force concentrations and the risk of overload and/or deformation of the elongated elements at the level of the opening are reduced.

According to a second aspect of the invention, a method is provided for fastening a fastening assembly according to the first aspect of the invention, the method comprising the following steps:

providing the one or more elongated elements;
inserting the one or more fastening elements into one of the elongated elements in the removable state;
aligning the central axis of the opening of the respective fastening element with a corresponding opening in the elongated element;
rotating the fastening elements from the removable state to the fastened state about the central axis of the opening of the fastening element; and
inserting the screws through the opening of the fastening element so that the helical alignment element engages in the opening.

According to a further embodiment, a method is provided, the method comprising the following further step:
inserting the screws through the opening of the fastening element after the rotation from the removable state to the fastened state was performed; or
inserting the screws through the opening of the fastening element before the rotation from the removable state to the fastened state was performed.

BRIEF DESCRIPTION OF THE DRAWINGS

By way of example, some embodiments will now be described with reference to the accompanying Figures, wherein.

DETAILED DESCRIPTION OF EMBODIMENT(S)

Figure 1:
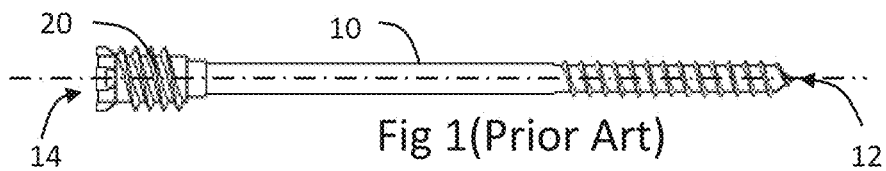
FIG. 1 shows an embodiment of a known screw having at its back side a helical alignment element.
Figure 2:
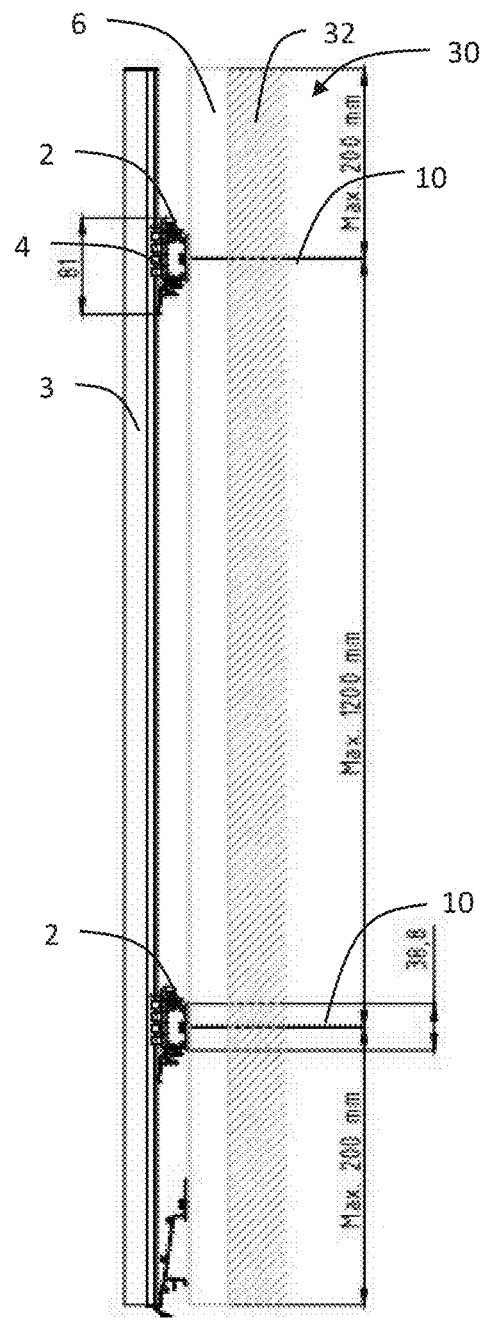
FIGS. 2 to 4 show respectively a side view, a perspective view and an enlarged fragment of the side view of a known fastening assembly.
Figure 3:
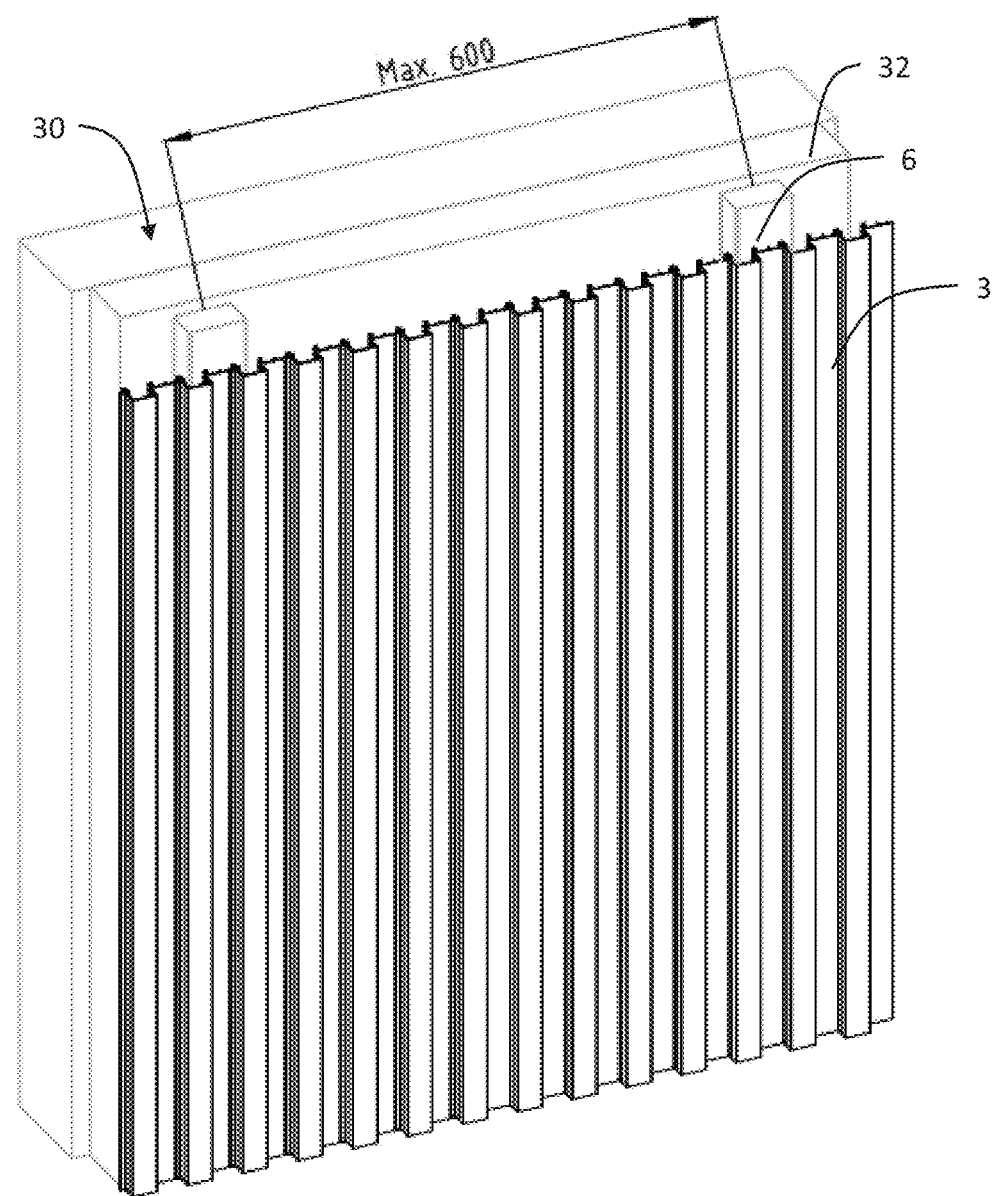

As may be seen in FIGS. 5 to 8, an embodiment for a fastening assembly 1 comprises an elongated element 2 extending along a longitudinal direction 5 and is applied on a wall 30 by means of a screw 10 having a helical alignment element 20. The elongated element 2 according to the shown embodiment functions, for example, as a structural element similar to that mentioned above with respect to FIGS. 1 to 4. It is however clear that alternative embodiments and applications are possible for the elongated element 2, such as, for example, suitable elongated elements for fastening building elements to an outer wall or inner wall of a building or building structure, structure elements for fastening coverings, laths, slats, etc, profiles for fastening solar panels, etc. Preferably, these are elongated elements 2 of which the distance from the wall should be aligned in function of the parts to be fastened, such as panels, plates, planks, etc. The term wall should thereby be interpreted broadly and comprises any suitable surface for fastening a fastening assembly, such as side walls, ceilings, floors of buildings or structures, a suitable base surface, etc.

According to the shown embodiment, the longitudinal direction 5 of the elongated element is substantially horizontal, it is however clear that alternative embodiments are possible wherein the longitudinal direction 5 is vertical or shows any other suitable direction, such as, for example, according to a suitable angle with respect to the wall of 30°, 45°, 60°, or any other suitable angle.

Figure 4:
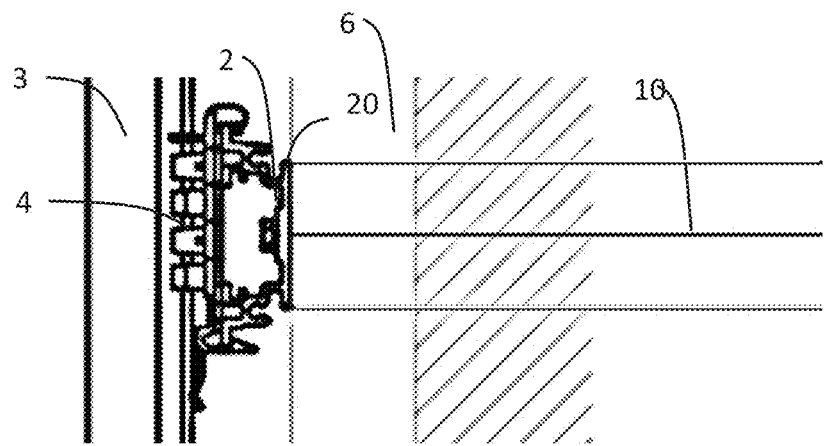
Figure 5:
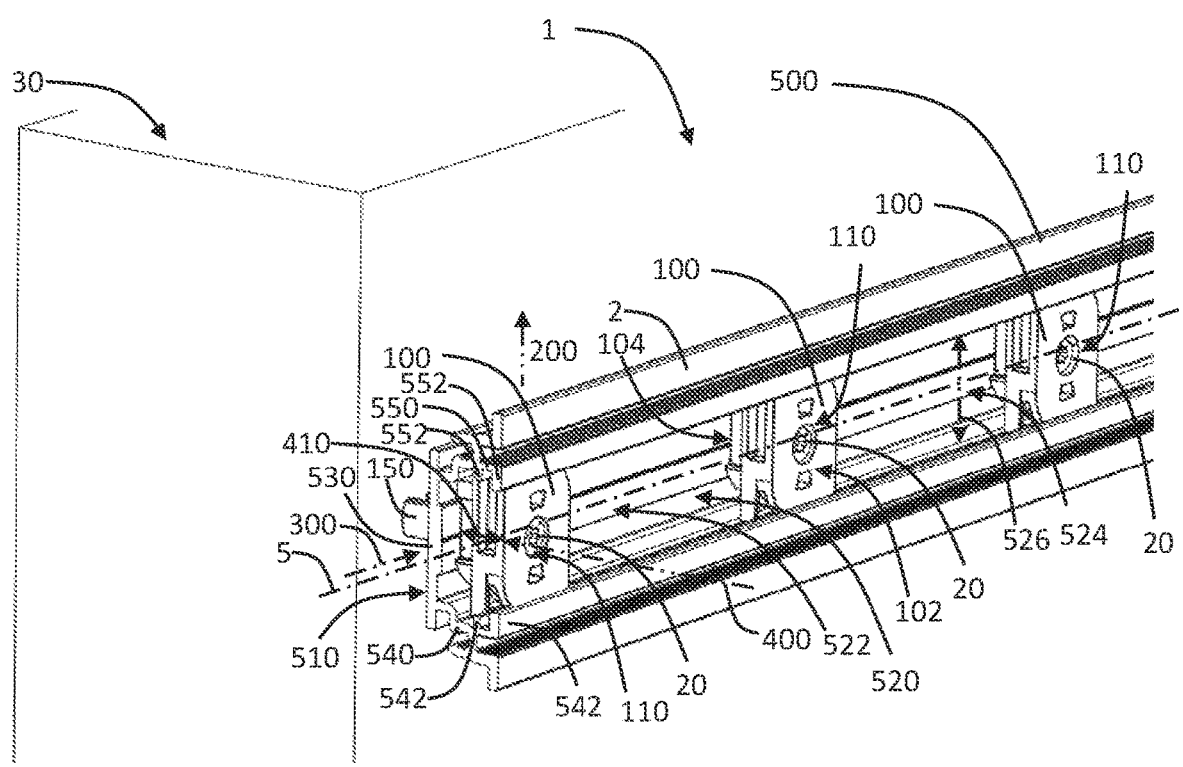
FIGS. 5 to 8 show a fastening assembly according to the invention, wherein a fastening element according to the invention is in several angular position.
Figure 6:
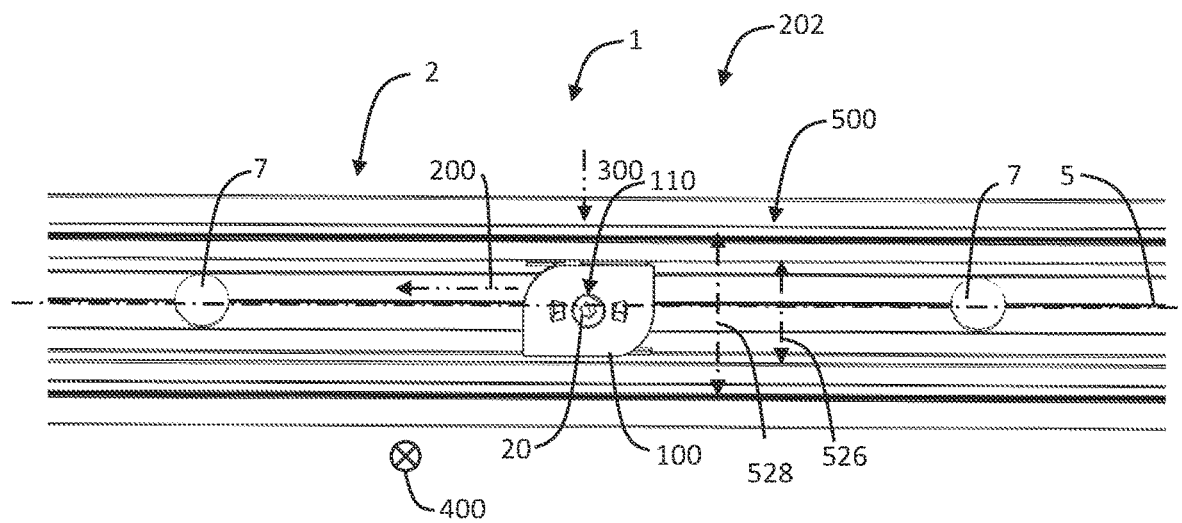
Figure 7:
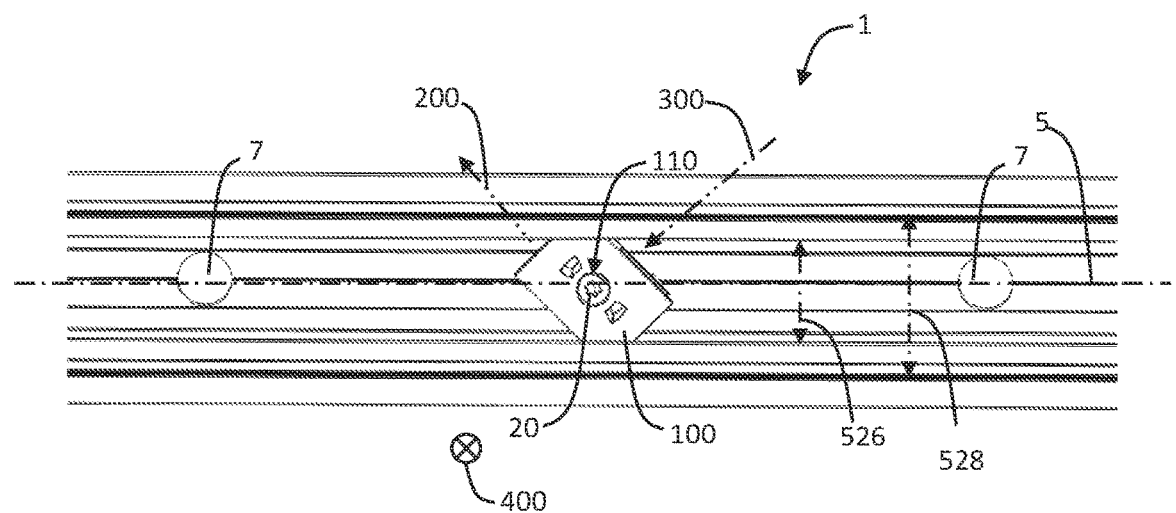
Figure 8:
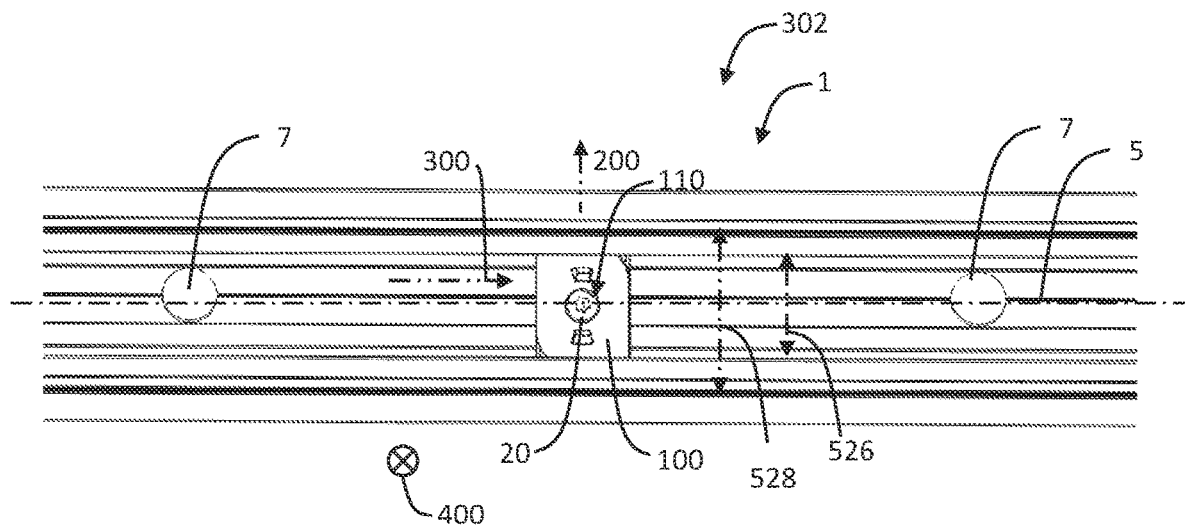

As may best be seen in FIGS. 6 to 8, this embodiment of the elongated element 2 has openings 7 disposed through the elongated element 2 configured for inserting a screw 10 through the elongated element 2 in the wall 20. It is clear that similar to the known embodiment of FIGS. 1 to 4, the screw 10 is inserted through the opening 7 into the wall. However, as may best be seen in FIG. 5, it is no longer necessary to make thereby use of elongated transverse elements. The fastening assembly 1 according to the shown embodiment comprises a fastening element 100, which in the fastened state, as shown in FIG. 5, is disposed in the elongated element 2 which is formed according to the invention as an elongated profile 500 having a C-shaped cross-section, as is described in more detail below. In this fastened state, as may be seen in FIG. 5, the helical alignment element 20 of the screw 10 is inserted in an opening 110 of the fastening element 100 and this helical alignment element engages also in the opening 110 on the fastening element 100. In the shown state in FIGS. 5 to 8, wherein the screw 10 is inserted in the wall 30 through the opening 100 of the fastening element 100 and the opening 7 of the profile 2, the central axis 112 of the opening 110 of the fastening element 100 and the opening 7 of the profile 500 substantially coincide, as well as the central longitudinal axis of the screw 10 disposed in the openings and the helical alignment element 20 of the screw 10. It is clear that this central axis 112 according to the shown embodiment runs substantially transverse to a plane parallel to the wall 30, and that his central axis 112 runs also transverse to the longitudinal direction 5 of the elongated element 2. When, in the context of this description, transverse is used, it should be interpreted as transverse provided common tolerances depending on the application, for example 90°+/−10°, preferably 90°+/−5°. As may be seen in FIG. 5, the profile 500 is in the shown embodiment connected to the helical alignment element 20 of the screw 10 by the fastening element. Thus, it is clear that aligning the profile 500 to the wall 30 may occur in this way by controlling the position of the helical alignment element 20 in the opening 110 of the fastening element 100, whereby the distance of the fastening element 100 to the wall will be aligned and therefore also the profile 500 connected to the fastening element 100. It is clear that preferably, in line with the shown exemplary embodiment, an elongated profile 500 having a C-shaped cross-section is being used, preferably manufactured in a suitable metal, however, alternative embodiments are possible for the elongated elements 2, such as, for example, alternative embodiments of elongated profiles or other elongated elements 2, which have a suitable internal cavity for fastening a fastening element 100 similar as described in more detail below. Furthermore, such alternative embodiments of the elongated elements 2 may also be made of another material that a suitable metal, such as, for example, a suitable plastic, wood, etc.

As may also be seen in the views of FIGS. 7 to 10, the fastening element 100 has an opening 110 with a central axis 112 extending from the front side 102 to the back side 104, wherein front side 102 indicates the visible side which in the inserted state faces away from the wall 30 and back side 104 indicates the opposite side 104 which in the inserted state faces the wall 30. As may be seen, these sides 102, 104 extend substantially transverse to the central axis 112 of the opening. Furthermore, the shown embodiment of the fastening element 100 has sides 106, 108 extending between this front and back side 102, 104 and which will be referred to as sides 106, 108 and which thus extend substantially parallel to the central axis 112 of the opening 110. It is furthermore clear that the opening 110 is configured so that, after the screw 10 is inserted therethrough, the helical alignment element 20 may engage therein. That is, the screw thread or other screw elements of the helical alignment element 20 cooperate with corresponding screw elements and/or cut into the side walls of the opening 100 so as to realise by means of the helical alignment element 20 a displacement of the fastening element 100 along the direction of the central longitudinal axis 112 of the opening 110.

Figure 9:
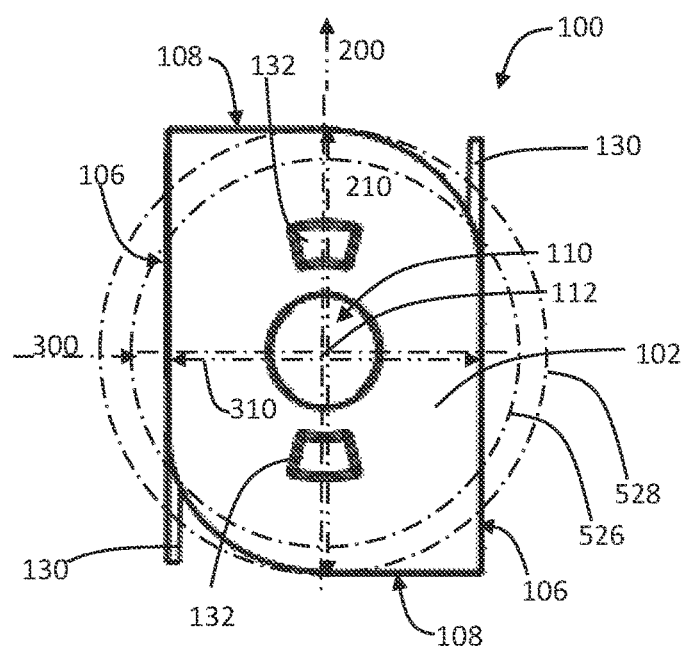
FIGS. 9 to 11 show a front view and two perspective views of an embodiment of the fastening element from FIGS. 5 to 8.

As may be best seen in the front view of FIG. 9, is the fastening element 100, viewed transversally to the central axis 112 and viewed from the direction of a first angular position 200 about the central axis 112, extending over a first distance 210, to which in the context of this description we will refer to as the length 210 and the longitudinal direction 200 of the fastening element 100. As may also be seen is the fastening element 100 extending transversally to the central axis 112 and viewed from the direction of a second angular position 300 about the central axis 112 and over a second distance 310, to which in the context of this description we will refer as the width 310 and the transverse direction 300 of the fastening element 100. Finally, as may best be seen in FIG. 4, is, in the fastened state, the basis body of the fastening element 100 located in the elongated element 2 and in which the opening 110 is located, extending over a certain third distance according to a third direction parallel to the central axis 112 of the opening 110, to which in the context of this application we will refer as the depth 410 and the depth direction 400 of the fastening element 100. According to the shown embodiment the longitudinal direction 200 is substantially transverse to the transverse direction 300, however alternative embodiments are possible in which the difference between both directions 200, 300 has another suitable angle and is for example in the range of 30° up to and including 150°, preferably in the range of 75° to 105°. It is also clear that the width 310 is smaller than the length 210.

It is clear that the shown embodiment of the fastening assembly includes a fastening element 100 and an elongated element 2 comprising an elongated profile 500, for example a metal profile, such as, for example, a steel of aluminium profile 500. As shown, the embodiment of the elongated profile 500 comprises a C-shaped cross-section 510. In other words, the shown embodiment of the fastening element 100 is configured for fastening an elongated element 2 comprising an elongated profile 500 having a C-shaped cross-section 510. Such an elongated profile 500 having a C-shaped cross-section 510 has a cross-section comprising substantially: a back wall 530, which in the state fastened to the wall faces the wall 30, two opposite side walls 540, 550 extending substantially transversally to the back wall 530 in a direction away from the side wall 30. Each of the side walls 540, 550 comprises furthermore one or more extending walls 542, 552 in the direction of the opposite side wall 540, 550, which complete that basic shape of the substantially C-shaped cross-section 510 of the elongated profile 500. Additionally, it is clear that the C-shaped cross-section 510 of the elongated profile 500 has an open side 520, which will in the context of this description be described as an open front 520, at the side of the profile 500 facing away from the wall 30 when fastened to the wall 30. Thus, the open front 520 of the elongated profile provides access to the interior cavity 522 of the cross-section 510 of the profile 500. In addition, the open front 520 of the profile 500 has an opening 524 extending over a certain distance 526 transversally to the longitudinal direction 5, as is for example shown in FIGS. 4-8. It is however clear that the profile 500, as in the shown exemplary embodiment may contain additional elements apart from the basic shape having the C-shaped cross-section, such as, for example, suitable slots, protrusions, openings, clamping elements, etc., for example for fastening additional elements.

As may best be seen in the view of FIGS. 6 and 9, the width 310 of the fastening element 100 is less than this distance 526 from the opening 524 of the open front 520 of the profile 500. This means that, as shown in FIG. 6, in this orientation, the fastening element 100 can be inserted into the cavity 522 of the profile 500 through the opening 524, since the width 310 of the fastening element is less than this distance 526 from the opening 524 at the front 520 of the profile. As shown, the fastening element 100 in this orientation, in which the width direction 300 of the fastening element 100 is substantially transverse to the longitudinal direction 5 of the profile 500, may thus be inserted into the internal cavity 522 of the profile 500 in the depth direction 400. For the shown exemplary embodiment wherein the longitudinal direction 200 is transverse to the width direction 300, it is clear that in this position the longitudinal direction 200 of the fastening element 100 is substantially parallel to the longitudinal direction of the profile 500. Furthermore, the fastening element 100 is preferably inserted so that the central axis 112 of the opening 110 of the fastening element 100 coincides with the central axis of the opening 7 in the back wall 530 of the profile 500 at the position where the fastening element 100 is disposed. In other words, the first distance or width 310 of the fastening element 100 is configured so that the fastening element 100 in the first angular position 200 may be brought into or out of the elongated profile 500 through the open side 520. It is clear that in this orientation, the fastening element 100 is nowhere wider than the width 310, viewed over its full length along the longitudinal axis 5 of the profile 500, or in other words, in this position the projection of the fastening element 100 fits according to the central axis of the openings 7, 112 completely in the opening 524 of the open front 520 of the profile 500. Thus, the state shown in FIG. 6 may be defined as a removable state, wherein the fastening element 100 may be brought into and out of the profile 500.

Subsequently, after inserting the fastening element 100 into the elongated profile 500, as shown for example in FIG. 6, with the width direction 300 being transverse to the longitudinal direction 5 of the elongated profile 5, and the central axis of the openings 7, 112 of the fastening element 100 and the profile 5 coinciding, are rotated from this removable state 202 as shown in FIG. 6, to a fastened state 302 as shown for example in FIG. 8. In the exemplary embodiment shown, this means a rotation through 90° clockwise, however it is clear that alternative embodiments are possible in which a rotation in an anti-clockwise direction and/or a rotation through a different angular rotation are possible. It is clear that in this fastened state 302, as shown in FIG. 8, as well as FIG. 5, the fastening element 100 is positioned within the internal cavity 522 of the profile 500. The figures show that after positioning, the fastening element 100 is positioned inside the internal cavity 522, meaning that it is completely contained within the internal cavity 522. Thus, when considering the C-shaped cross-section of the elongated profile, no parts of the fastening element 100 protrude out of the cavity 522 defined by the C-shaped cross-section. Furthermore, the figures show that when rotating the fastening element 100 from the removable state 202 towards the fastened state 302, the fastening element 100 runs against the elongated profile 500, thereby bringing the fastening element 100 in contact with the elongated profile 500. In the fastened state 302, the fastening element 100 may no longer be brought out of the elongated profile 500. As may be seen, in the fastened state 302, the first longitudinal direction 200 of the fastening element 100 is transverse to the longitudinal axis 5 of the elongated element 2. As the edges 108 of the fastening element 100 run against the side walls 540, 550 in the internal cavity 522 of the profile 500, a further rotation of the fastening element 100 is blocked. As shown, the fastening element has in the sides 108 preferably slots and/or protrusions complementary to the slots and/or protrusions in the side walls 540, 550 of the internal cavity 522 of the profile 500, so that the sides 108 of the fastening element 100 and the side walls 540, 550 interlock and are removably connected by friction and/or clamping. It is clear that such a connection also prevents the fastening element from being removed from the internal opening of the profile 500 according to the direction of the central axis 112 of the opening 110 of the fastening element 100 in this fastened position 302. To remove the fastening 100 again, the fastening element 100 must first be rotated, counter clockwise, or in other words back in the opposite direction, about the central axis 112 of the opening of the fastening element 100 from the fastened position 302 of FIG. 8 to the removable state 202 in FIG. 6. It is clear that variant embodiments of the fastening element are possible, in which the length 210 is configured so that the fastening element 100, after inserting the fastening element 100 into the elongated profile 500 and rotating from the removable state 202 towards the fastened state 302, runs against the elongated profile 500, and may no longer be brought out of the elongated profile 500 in this fastened position 302. In other words, the fastening element 100 is configured to cooperate in such a way with the elongated element 2 to allow rotation of the fastening element 100 about the central axis 112 of the opening 110 between an fastened state 302, with the longitudinal direction 200 of the fastening element 100 being transverse to the longitudinal axis 5 of the elongated element 2 and a removable state 202 with the width direction 300 being transverse to the longitudinal axis 5 of the elongated element 2. As shown schematically in FIG. 9, the length 210 of the fastening element 100 corresponds substantially to the corresponding distance 528 between the side walls 540, 550 of the internal cavity 522 of the fastening profile 500. It is clear that the distance 528 between these side walls 540, 550 is at least at one location along the depth direction 400 greater than the distance 526 from the opening 524 giving access to the internal cavity 522 at the open front 520 of the profile 500.

According to the exemplary embodiments shown in FIGS. 4 to 9, the diameter of the opening 110 in the fastening element 100 is preferably smaller than the opening 7 in the elongated element 2 with which the central axis 112 of the opening 110 coincides in the fastened state 302. Preferably, the diameter of the opening 110 is smaller than the diameter of the helical alignment element 20 so that the helical alignment element may engage the walls of the opening 110. Preferably, the diameter of the opening 7 in the elongated profile 500 is greater than the diameter of the helical alignment element 20 so that it does not engage the walls of the opening 7 of the profile 500 and does not cause deformations or mechanical stress on the profile 500.

The fastening element is preferably made of a softer material than the material of the elongated element. Preferably, the fastening element is made of a suitable plastic and the elongated element from a suitable metal. A suitable plastic for the fastening element is, for example, one or more of the following materials: POM also referred to as Polyoxymethylene, PA also referred to as Polyamide, ABS also referred to as Acrylonitrile-butadiene-styrene, or any other suitable plastic. Furthermore, it is advantageous that the material of the fastening element 100 is softer than the material of the helical alignment element 20 of the screw 10. This allows to manufacture the fastening element 100 in a simple manner, with a shape that fits well with the shape of the internal cavity of the elongated profile in the fastened state. Moreover, the material of the helical alignment element 20 should be no longer harder than the material of the elongated profile 500, for example, it is possible to use a standard metal helical alignment element 20, even in the case of metal elongated profiles 500 and it is no longer required, for example, to employ a tempered steel helical alignment element 20 for, for example, a profile 500 made of aluminium. However, it is clear that the according to alternative embodiments the fastening element 100 may also be made in whole or in part of other suitable materials, such as a suitable metal, the material of the fastening element 100, for example, being different from that of the elongated element 2 in order to allow for improved fastening of the helical alignment element 20.

Figure 10:
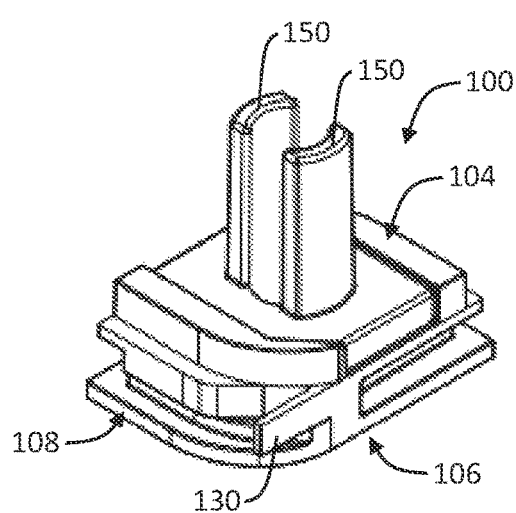
Figure 11:
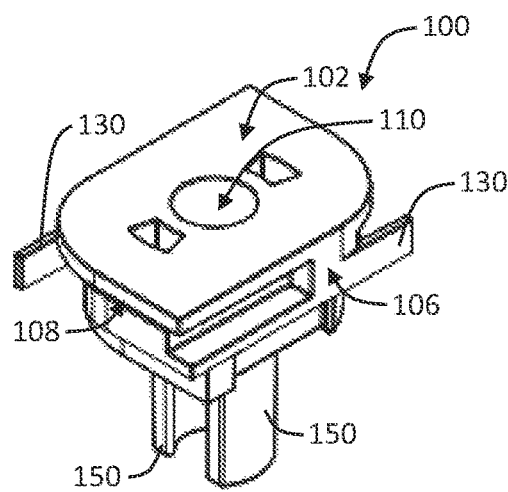
Figure 12:
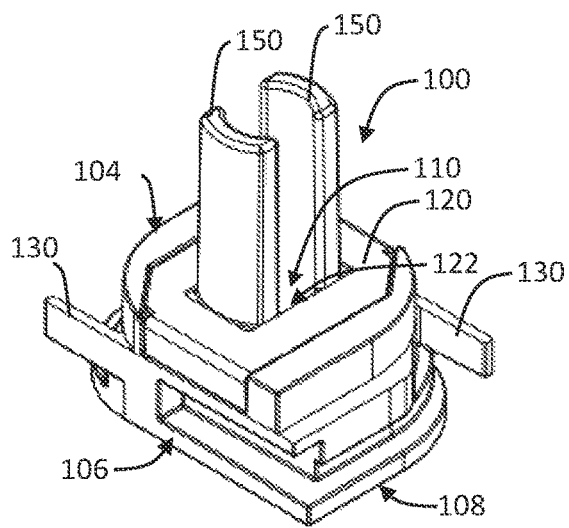
FIGS. 12 and 13 show two perspective views of an alternative embodiment of the fastening element, similar as shown in FIGS. 9 to 11.
Figure 13:
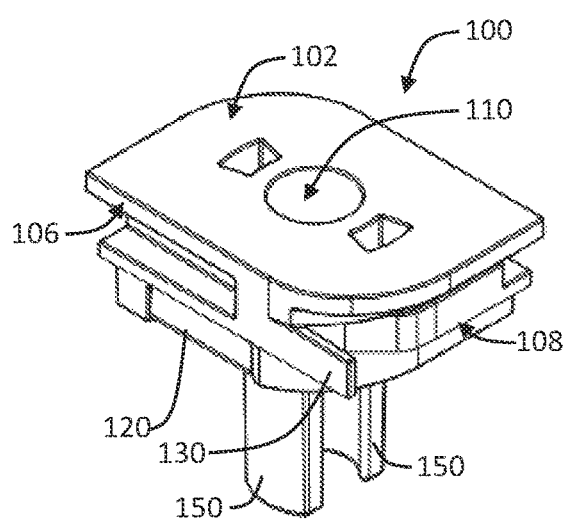
Figure 14:
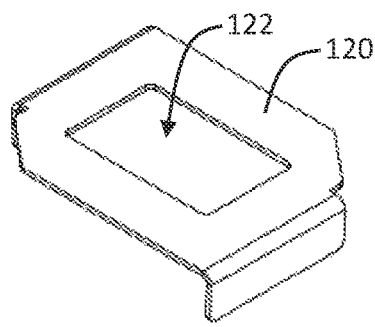
FIGS. 14 and 15 show an embodiment of the securing plate of the embodiment of FIGS. 12 and 13.
Figure 15:
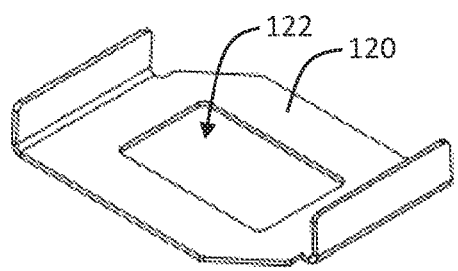

FIGS. 10 and 11 show perspective views of an embodiment of a fastening element as described above, which is for example completely made of plastic. FIGS. 12 and 13 show an alternative embodiment of a fastening element 100 that is similar to the embodiment described above and functions similarly. However, different from the embodiment described above, the plastic part of the fastening element also comprises a metal plate 120 disposed thereon surrounding the opening. This metal plate 120 functions as a non-combustible part 120 which in case of fire continues to ensure a connection between the screw 10 having the helical alignment element 20 and the elongated profile 500, even if the plastic of the fastening element has melted or burned. It is clear that alternative embodiments are possible, in which, for example, the entire fastening element is made of non-combustible material. According to the exemplary embodiment shown, the metal plate 120 is designed in such a way that it functions as a clip which may be disposed in and around a corresponding insert in the plastic base body of the fastening element 100. It may furthermore be seen, for example in FIGS. 14 and 15 which show different perspective views of the metal plate, that this metal plate also has an opening 122 configured to surround the opening 110 of the fastening element. It is further clear that the metal plate 120 is configured so that when fastened to the base body of the fastening element 100, and thus when it forms part of the fastening element 100, the characteristics described above in terms of dimensions and design, such as, for example, in terms of length and width, as well as the possibility to rotate in the internal cavity of the elongated element, remain respected and not impaired.

According to an exemplary embodiment shown in FIG. 9, the fastening element 1 comprises grip elements 132, allowing to grip the fastening element 1 for rotating it from the removable state 202 towards the fastened state 302 and vice versa. Preferably, the grip elements 132 are positioned on the fastening element 100 such that after inserting the fastening element 100 into the internal cavity 522 of the elongated profile 500, the grip elements are accessible. This implies that the distance between the grip elements 132 is small enough, such that the grip elements can be reached through the open side 520 of the profile 500, as is clear from FIGS. 6 and 8. In the shown embodiment, the fastening element 100 comprises two grip elements 132 at opposing sides of the opening 110. In the shown embodiment, the grip elements 132 are provided as holes or notches at the front side 102 of the fastening element 100. In other embodiments, even more grip elements may be present, or they may be provided like e g small protrusions on the front face 102 of the fastening element 100. The grip elements 132 allow to rotate the fastening element by means of a suitable tool, such as, for example, a suitable pliers, thereby applying a substantial torque. In this way, the fastening element 100 can easily be mounded and demounted, even when it is substantially clamped in the cavity 522. As shown in FIG. 5, after positioning the fastening element 100, the grip elements 132 do not protrude out of the internal cavity 522. As such, they do not impede a simple mounting of the wall covering at the open side 520 of the profile 500.

According to the embodiment shown, the fastening element 100 further comprises two securing elements 130 that allow for deactivation. These securing elements 130 are configured to cooperate with the elongated element 2 in the fastened state 302 to resist rotation to the removable state 202. After deactivation, they allow again for rotation from the attached state 302 back to the removable state 202. According to the embodiment shown, the two securing elements 130 allowing for deactivation are formed as elongated, flexible protrusions disposed so that their farthest end is at a radial distance from the central axis 112 of the opening 110 which is greater than half the length 210 of the securing element 210, or, as mentioned above, substantially half the distance 528 between the side walls 540, 550 of the internal cavity 522 of the profile 500. As may be seen in the steps shown in FIGS. 6, 7 and 8, these securing elements 130 will realise a securing of the fastening element upon rotation from the removable state 202 in FIG. 6, through the intermediate position shown in FIG. 7 with the farthest ends of the securing elements 130 running against the side walls 540, 550 of the profile 500 and the securing elements 130 deflecting towards the central axis 112 of the opening 110, to the fastened state 302 in FIG. 8, wherein the securing elements 130 may spring back loose and may then extend along their longitudinal axis substantially transversely to the longitudinal axis 5 of the profile 500. Upon initiation of rotation back from the fastened state 302 in FIG. 8 to the removable state 202 of FIG. 6, it is clear that these securing elements 130 will resist since they will push off along their longitudinal direction against a respective side wall 540, 550 of the profile 500 and thus will resist this rotation. However, when a sufficiently large torque is applied, the securing elements 130 will anyhow bend in the other direction and allow again for rotation. To enable this deactivation, according to the embodiment shown, two notches or openings 132 were provided, in order to be able to exert a sufficiently large torque on the fastening element 100, for example by means of a suitable tool, such as, for example, a suitable pliers.

It is clear that, in addition to the embodiments described above, numerous variant embodiments are possible in which a fastening assembly 1 is realised which comprises one or more fastening elements 100 similar to those described above, preferably several fastening elements 100 per elongated element 2. It is therein also clear that in such embodiments, the fastening assembly 1 includes one or more elongated elements 2 configured to be fastened to a wall 30 by means of one or more screws 10 containing a helical alignment element 20. The respective screw 10 is therein inserted into the wall 30 through an opening 7 in the elongated element 2 and an opening 110 in the fastening element 100 whose central axis coincides. The fastening assembly 1 is therein configured to connect the elongated element 2 via the respective fastening element 100 to the corresponding helical alignment element 20 of the corresponding screw 10 in the fastened state 302. Preferably, similarly as described above, the fastening assembly 1 further includes the one or more corresponding screws 10. In the fastened state 302, the elongated element 2 is preferably directly connected to the fastening elements 100 and the respective helical alignment elements 20 are directly connected to the corresponding opening 110 of the fastening elements 100. It is clear that direct connection means that the elements make contact and/or engage each other. Preferably, the elongated element 2 is no longer directly connected to the screws 10, but only via the fastening elements 100, it being further advantageous if the fastening elements 100 form a plastic interruption between a metal elongated element 2 and metal screws 10, which may prevent a thermal bridge and contact corrosion.

According to a preferred embodiment, and as may be seen, for example, in FIG. 5, the fastening element 100 extends, along the depth direction 400 corresponding to the central axis 112 of the opening 110, over a depth 410 that is greater than the wall thickness of the elongated element. 2 at the corresponding opening 7. Thus, a larger support surface is realized on the one hand for the helical alignment element 20 in the opening 110 of the fastening element 100 and, on the other hand, also for the side walls 540, 550 of the elongated element 2 on the corresponding side walls 108 of the fastening element 100.

Figure 16:
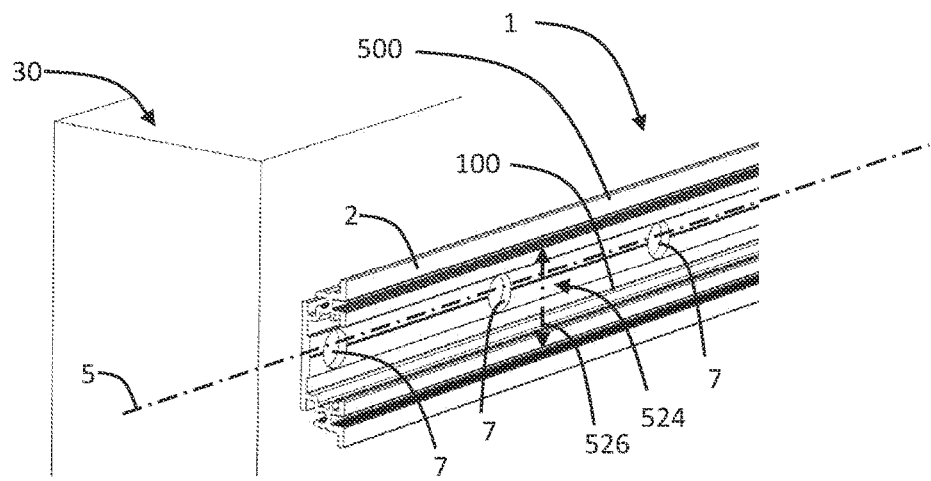
FIGS. 16 to 20 show an alternative embodiment of a method for fastening a fastening assembly for fastening an embodiment of a fastening assembly similar to that shown in FIGS. 5 to 8.
Figure 17:
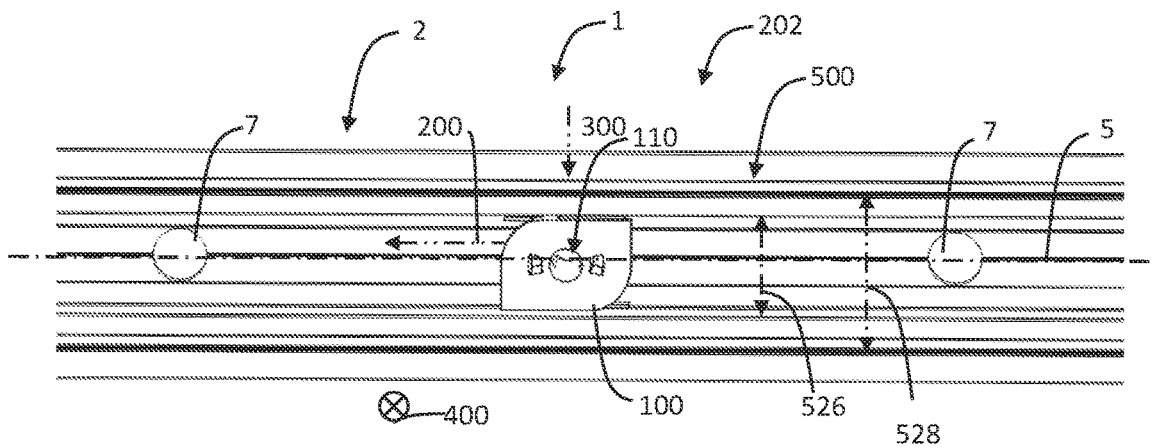
Figure 18:
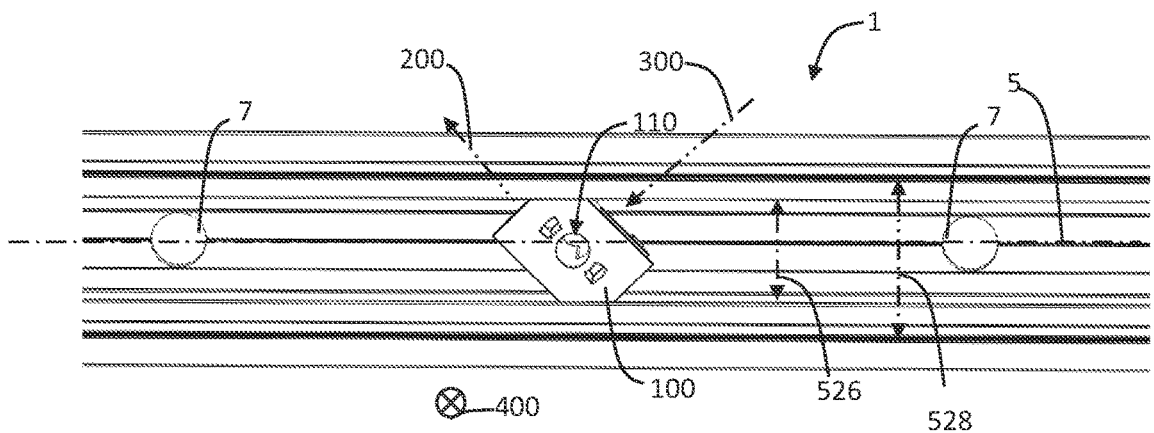
Figure 19:
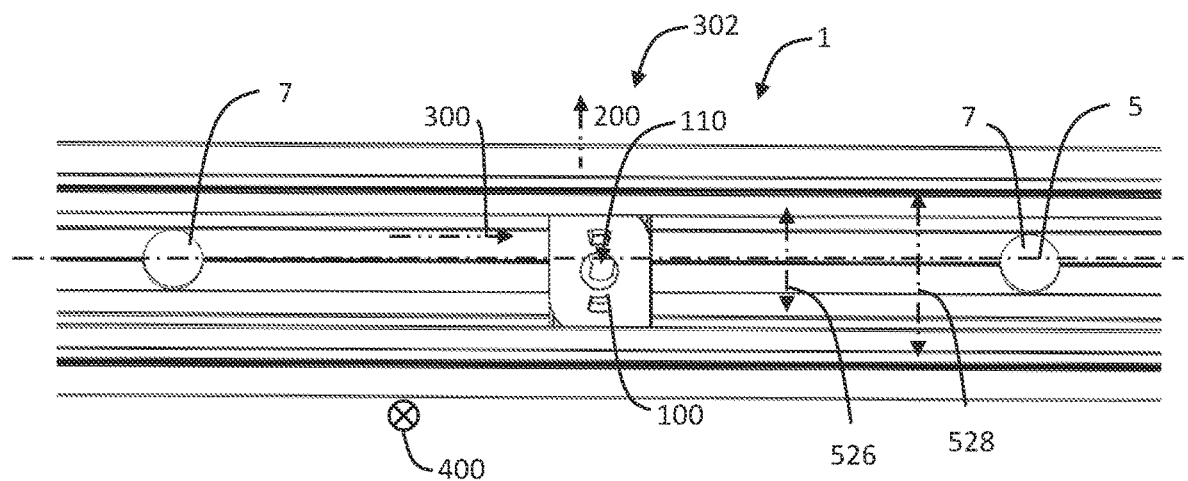
Figure 20:
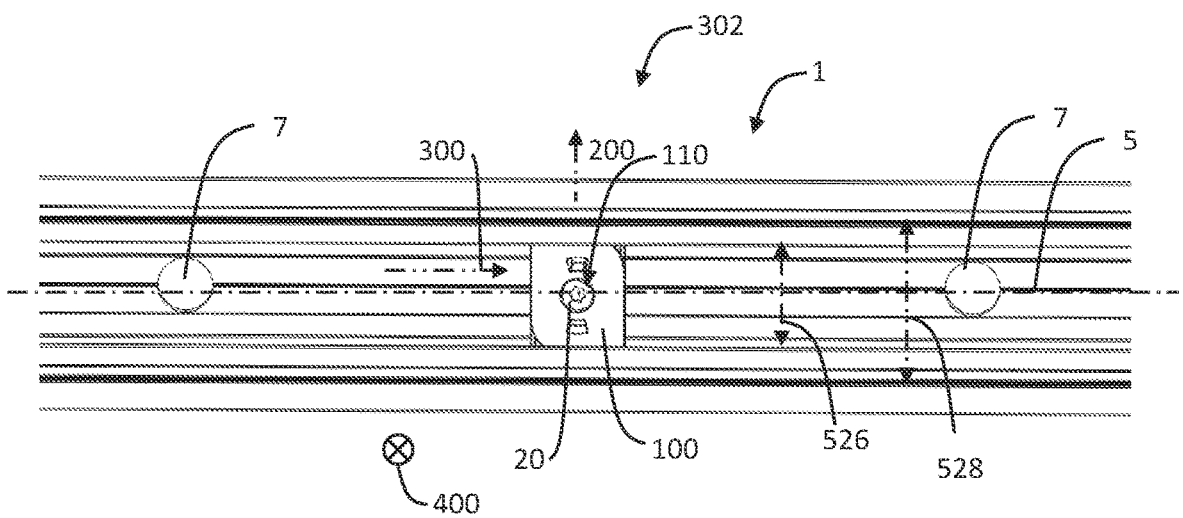

It is further clear, on the basis of the embodiments described above, in particular the steps shown in FIGS. 6 to 8, that according to such embodiments, the method of fastening the fastening assembly 1 includes the following steps. After providing the one or more elongated elements 2, for example near the wall 30 as shown in FIG. 16 which is similar to FIG. 5 but without the fastening elements 100 and the screws 10. Subsequently, the one or more fastening elements are inserted in one of the elongated elements 2 in the removable state 202, in other words through the open side 520 of the profile 500. It is clear that this insertion of the fastening elements 100 may be done in a flexible manner, for example along the depth direction 400 at any suitable location along the longitudinal axis 5 of the profile 500. After aligning the central axis 112 of the opening 110 of the respective fastening element 100 having a corresponding opening 7 in the elongated element 2, the fastening elements 100 may be rotated from the removable state 202 to the fastened state 302 about the central axis 112 of the opening 110 of the fastening element 100, as shown sequentially in FIGS. 7 and 8. It is clear that a method for removing the fastening elements includes similar steps, but in reverse order. In the exemplary embodiment shown in FIGS. 6 to 8, the screws 10 are inserted through the opening 110 of the fastening element 100 before the rotation from the removable state 202 to the fastened state 302 is performed. In this way, they may assist, for example, in aligning the opening 110 of the fastening element 100 and the opening 7 of the elongated element 2 when inserting the fastening element 100 into the elongated element 2 along the depth direction 400. However, it is clear that alternate embodiments are possible in which the insertion of the screws 10 through the opening 110 of the fastening element 100 is done so that the helical alignment element 20 engages the opening 110 at another time during the method for fastening. Such an alternative embodiment is shown, for example, in FIGS. 17 to 19, which show similar views to FIGS. 6 to 8, but without the presence of a screw 10. It is clear that according to such a variant embodiment, inserting the screws 10 through the opening 110 of the fastening element 100 is not performed until the rotation of the fastening element 100 inserted into the elongated element 2 from the removable state 202 to the fastened state 302 has been performed. This sequence is indicated in FIGS. 16 to 19, where the steps in FIGS. 16 to 19 are performed without the presence of a screw 10 and only after the step in FIG. 19, the step shown in FIG. 20 is performed, in which a screw 10 is inserted through the opening 110 of the fastening element 100.

As may be seen in, for example, FIGS. 5 and 10 to 15, the exemplary embodiments of the fastening element 100 described above include one or more plug elements 150 extending along the depth direction 400 and configured to pass through the opening 7 of the elongated element in the fastened state. to reach. Such plug elements 150 assist, in the methods described above, in aligning the openings 110 of the fastening element 100 having the opening 7 of the elongated element 2 during the insertion of the fastening element in the removable state. In the last described method, these plug elements 150 also assist in rotating the inserted fastening element 100 from removable state 202 to the fastened state 302 without a screw 10 having a helical alignment member 20 already present in the opening 110 of the fastening element 100. Such plug elements 150 provide furthermore additional security that the screw 10 and in particular the helical alignment element 20 does not directly contact the wall of the opening 7 of the elongated element 2, which prevents thermal bridges and contact corrosion. This ensures, for example, that the fastening elements 100 may already be arranged in the elongated profile 2 in advance. It is furthermore clear that such fastening elements 100 allow each to be individually disposed and/or removed without it being necessary to first dispose and/or remove other fastening elements 100, allowing for efficient mounting.

Although the term helical alignment element 20 has been used in the context of this description, it is clear that such element may also be referred to as an alignment nut, an alignment bolt, or any other suitable term and that this term thus also includes and describes such elements wherein a helical element 20 is fixedly, releasably, rotatably, etc. attached to the screw 10 at the level of its back end configured to, when inserted and engaged in the opening 110 of the fastening element 100, adjust the position of the fastening element 100 along the central longitudinal axis of the screw 10 by means of a rotation of a helical element, such as, for example, screw thread, on the outside of the helical alignment element 20.

It is clear that further combinations and/or variant embodiments are possible without departing from the scope of protection as defined in the claims.

The invention claimed is:

1. A fastening assembly comprising:
   one or more fastening elements, and
   one or more elongated elements,
   a fastening element of the one or more fastening elements being configured for fastening an elongated element of the one or more elongated elements, to a wall by means of a screw comprising a helical alignment element, wherein the screw is inserted in the wall through an opening in the elongated element, and wherein:

the fastening element has an opening with a central axis, extending from a front side to a back side, the opening being configured so that after the screw has been inserted through the opening, the helical alignment element may engage therein; and the fastening element, viewed transversally to the central axis and viewed in a direction of a first angular position about the central axis, extends over a first distance, the fastening element, viewed transversally to the central axis and viewed in a direction of a second angular position about the central axis, extends over a second distance, wherein the second distance is smaller than the first distance and a difference between the first angular position and the second angular position is in a range of 30° to 150°, and wherein the fastening element is configured to cooperate with the elongated element to allow rotation of the fastening element about the central axis of the opening between a fastened state, in which the first angular position of the fastening element is transverse to a longitudinal axis of the elongated element, and a removable state, in which the second angular position is transverse to the longitudinal axis of the elongated element, wherein:

the elongated element comprises an elongated profile with a C-shaped cross-section having an open side and an internal cavity;

the second distance, in the removable state, allows the fastening element to be brought through the open side into or out of the internal cavity;

the first distance, after inserting the fastening element in the internal cavity in the removable state and rotating the fastening element from the removable state towards the fastened state, allows the fastening element to run against the elongated profile; and in the fastened state, the fastening element is positioned within the internal cavity of the elongated profile and may no longer be brought out of the elongated profile.

2. The fastening assembly according to claim 1, wherein a difference between the first angular position and the second angular position is in a range of 75° to 105°.

3. The fastening assembly according to claim 1, wherein the opening in the fastening element has a diameter smaller than the opening in the elongated element with which the central axis of the opening in the fastened state coincides.

4. The fastening assembly according to claim 1, wherein the fastening element is made of a softer material than a material of the elongated element.

5. The fastening assembly according to claim 1, wherein the fastening element furthermore comprises a non-combustible part surrounding the opening of the fastening element.

6. The fastening assembly according to claim 1, wherein the fastening element comprises one or more securing elements configured to cooperate in the fastened state with the elongated element to resist against rotation to the removable state.

7. The fastening assembly according to claim 6, wherein one or more of the securing elements are configured to allow for deactivation, thereby allowing for a rotation back from the fastened state to the removable state after deactivation.

8. The fastening assembly according to claim 1, wherein the fastening assembly is configured to connect in the fastened state the elongated element via a respective fastening element of the one or more fastening elements to a corresponding helical alignment element of a corresponding screw.

9. The fastening assembly according to claim 8, wherein the fastening assembly furthermore comprises one or more screws each having a helical alignment element, and wherein, in the fastened state, the elongated element is directly connected to a respective fastening element of the one or more fastening elements and a corresponding respective helical alignment element is directly connected to a corresponding opening of the one or more fastening elements.

10. The fastening assembly according to claim 8, wherein, in the fastened state the elongated element is connected to the corresponding helical alignment element via the respective fastening element or the one or more fastening elements and is not directly connected to the corresponding screw.

11. The fastening assembly according to claim 8, wherein, in the fastened state, the respective fastening element of the one or more fastening elements extends, according to a depth direction corresponding to the central axis of the opening, over a depth greater than a wall thickness of the elongated element at the corresponding opening.

12. A method for fastening a fastening assembly according to claim 1, the method comprising:

providing the one or more elongated elements;

inserting the one or more fastening elements into one of the elongated elements in the removable state;

aligning the central axis of the opening of the respective fastening element of the one or more fastening elements with the opening in the elongated element;

rotating the one or more fastening elements from the removable state to the fastened state about the central axis of the opening of the fastening element; and inserting a screw through the opening of the respective fastening element of the one or more fastening elements so that a helical alignment element of the screw engages in the opening of the fastening element.

13. The method according to claim 12, the method comprising:

inserting the screw through the opening of the respective fastening element of the one or more fastening elements after the rotation from the removable state to the fastened state is performed; or inserting the screw through the opening of the respective fastening element of the one or more fastening elements before the rotation from the removable state to the fastened state is performed.

* * * * *